Dec. 8, 1970    G. B. GREENBERG    3,545,218
THERMOSTATIC CONTROL FOR AIR CONDITIONING SYSTEM
Filed Sept. 20, 1968    2 Sheets-Sheet 2

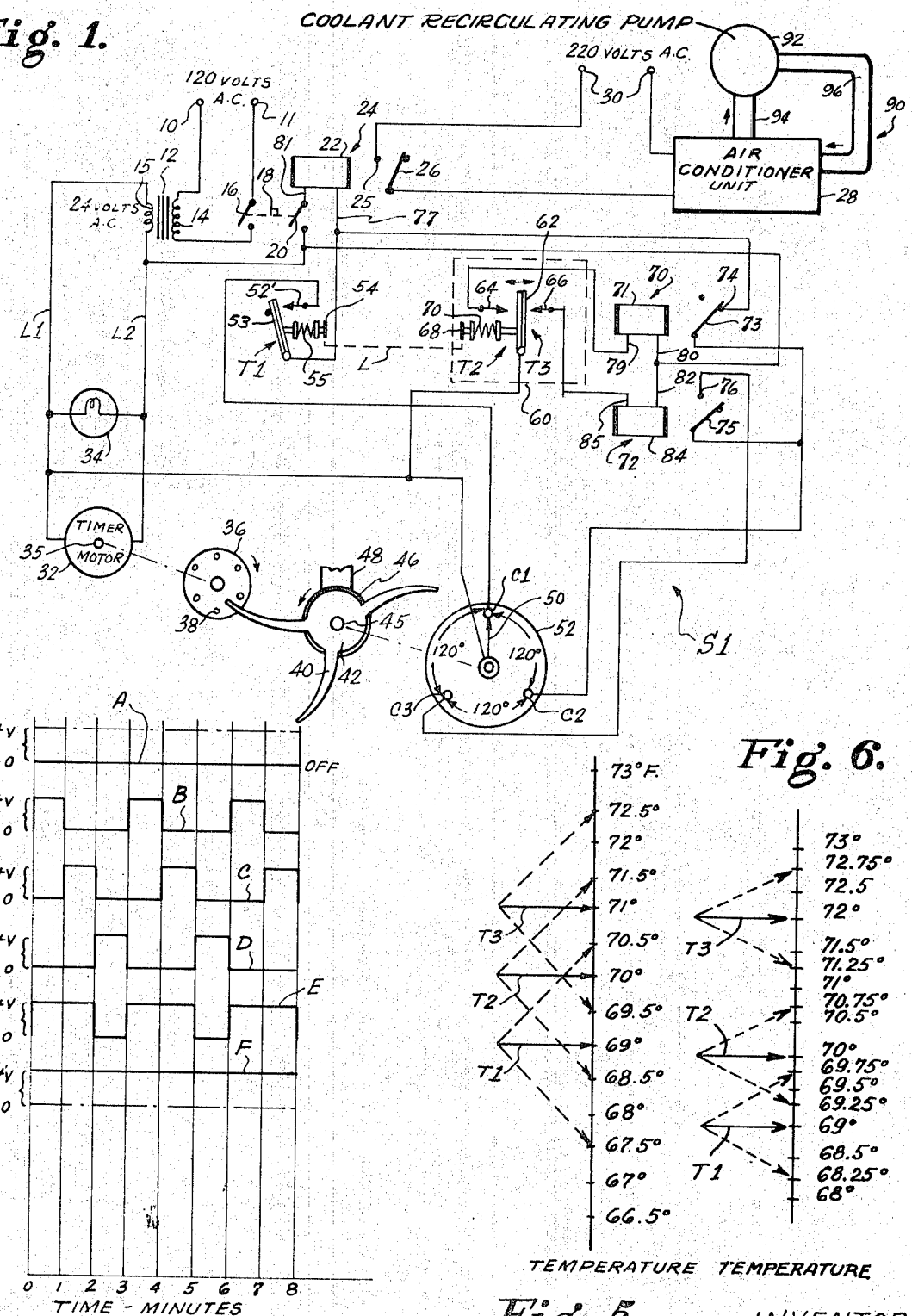

INVENTOR
Gerald B. Greenberg
BY
Polachek & Saulsbury
ATTORNEYS.

United States Patent Office 3,545,218
Patented Dec. 8, 1970

3,545,218
THERMOSTATIC CONTROL FOR AIR CONDITIONING SYSTEM
Gerald B. Greenberg, Bronx, N.Y.
(63—60 102nd St., Rego Park, N.Y. 11374)
Filed Sept. 20, 1968, Ser. No. 761,209
Int. Cl. F25d 21/06
U.S. Cl. 62—157                               9 Claims

ABSTRACT OF THE DISCLOSURE

A programmed thermostatic control device for an air conditioning unit is described. The device has three thermostat stages set to three different temperatures. Two of the stages overlap, while one is discrete. A sequence cycle timer provides timed switching in sequence, of the pilot control circuit of the air conditioning unit, to each of the three thermostat stages. The device controls the air conditioning unit so as to operate it intermittently for precisely conrolled short periods of time so that the comfort of the occupants of the temperature controlled environment is maintained. The device, further, provides more uniform temperature distribution and tighter temperature control. Also because it increases the comfort of the occupants, it permits the temperature setting to be higher; thus, it increases the relative capacity of the air conditioning equipment, permitting savings in the installation of new equipment and producing operating economy.

---

The invention concerns a novel programmed thermostatic control device for an air conditioning unit to increase the comfort of occupants of a temperature controlled environment while increasing the relative capacity of the air conditioning unit to produce such comfort and providing closer temperature regulation, more uniform temperature distribution, new equipment economies and at the same time, decreasing the operating expense of the air conditioning unit.

In conventional small commercial air conditioning installations, the air conditioner fan is in continuous operation, while the refrigerant compressor is cycled intermittently by a control thermostat. This thermostat is located where it can sense the average mean temperature for the air conditioned space. Usually, the set point spread of the thermostat is about three degree F. Thus, the thermostat turns the compressor on one and one-half degree above the nominal setting, and turns it off one and one-half degrees below that setting. This generally used system may seem adequate because the thermostatic control is simple and it seems to hold the environmental temperature within the limits of plus and minus one and one-half degrees of the nominal temperature setting. However, it is not actually satisfactory. While the thermostat actuates the compressor within the limits of the set point spread, temperature overshoot and undershoot adds about a degree to each end of the temperature cycle, resulting in an environmental temperature fluctuation of about five degrees. Temperature overshoot is caused by the temperature continuing to rise due to the heat load until the air conditioning system can distribute enough cool air throughout the environment to begin lowering the temperature. Temperature undershoot is caused by the evaporator continuing to absorb heat until it is raised to room temperature and until the cooler air in the ducts and congested about the register is distributed throughout the environment. Furthermore, what is not generally recognized is that people subjected to an air conditioned environment are more sensitive to other factors than they are to small temperature changes. Conventional thermostatic controls for air conditioning systems do not make allowance for those other factors. As a result, even though the temperature range of an air conditioned environment might seem ideal from an objective standpoint, the people who should be comfortable in the environment actually suffer quite a bit of discomforture. A simple example will make this clear.

Suppose a conventional thermostatic control of an air conditioning system maintains a desired temperature range by cycling the compressor on for fifteen minutes and off for ten minutes. After the compressor is on for more than several minutes, occupants of the air conditioned environment tend to be made uncomfortable by the chill of cold circulating air. After the compressor is off for more than a few minutes, the same occupants tend to feel to warm and they also tend to feel that the air has taken on a stale, stagnant quality. From this it will be perceived that the periods of greatest air conditioning comfort seem to be after the compressor is on for about two minutes and after it is off for about one minute. Conventional thermostatic controls for air conditioning systems which respond objectively only to actual temperature conditions have no way to accommodate these subjective reactions of people so as to maximize their periods of apparent comfort and to minimize their periods of apparent discomfort.

The present invention is directed at solving the aforementioned difficulties and providing other important benefits, some of which have already been mentioned.

According to the invention there is provided a thermostatic control device which maintains an air conditioning system operating in a desired narrow temperature range, and which produces conditions of greatest apparent comfort in their air conditioned environment. Also, these conditions of greatest apparent comfort are produced and maintained at a higher nominal thermostatic temperature setting than would be desirable with a conventional thermostat. This results in substantial operating economies. Since the air conditioned environment is maintained several degrees higher than normal, persons entering or leaving the air conditioned space experience reduced temperature shock, and reduced capacity equipment can do an adequate job resulting in installation economies, and so is related further important advantages of the invention.

The invention basically involves a device which can be termed a "programmed thermostat" assembly, which is a multistage assembly having three temperature stages set at different temperature levels which are simultaneously adjustable by turning a single temperature adjusting wheel. The multistage thermostat assembly is operated in conjunction with a continuously running sequence cycle timer. The timer drives two cams in such a manner as to achieve three stages per cycle from two single-pole, double-throw switches with no overlap between stages and with a minimal gap between stages. This minimal gap is achieved by wiring the switches so that the gap is dependent upon the transfer time of the switches rather than on the accuracy of the cams. Each of the timing stages is in turn connected to a stage of the thermostat assembly and so each stage of the thermostat is turned on for one part of the three-part cycle. The device controls operation of the compressor actuating relay in an air conditioning system employing a conventional refrigerant compresor.

Because of the nature of the control device, it provides continuous averaging of the demand upon the air conditioning compressor. This in turn results in the compressor placing only the average demand on the evaporative condenser of the recirculatory system, if such a system is used, instead of the maximum demand normally placed on the recirculatory system when a conventional thermostatic control is used. Thus, a lower capacity evaporative condenser may be installed to meet the average, rather than the maximum demand. If a low capacity recirculator is used with the compressor, a further thermostat may be installed at the intake line from the recirculator to the compressor to turn on and off the lowest temperature stage of the multistage thermostat assembly. This will prevent overloading the recirculator cooling system by reducing the heat load.

The invention provides control of temperature in a very narrow range. It is thus applicable to other temperature control installations such as controlling valves in chilled water and hot water and/or steam cooling and heating systems.

The invention further provides a simple positive method of throttling a large capacity cooling system during periods of light demand, together with a nearly instantaneous response to sudden sharp increases in demand. This makes the invention ideal for controlling air conditioning systems in such applications as conference rooms and theaters, etc.

The invention will be explained in further detail in connection with the drawings wherein:

FIG. 1 is a diagram of thermostatic control device embodying one form of the invention.

FIG. 4 is a pulse-time chart employed in explaining the operation principles of the invention.

FIG. 5 and FIG. 6 are temperature scales with indicated temperature settings of thermostat stages, used in explaining the invention.

Figure 3:
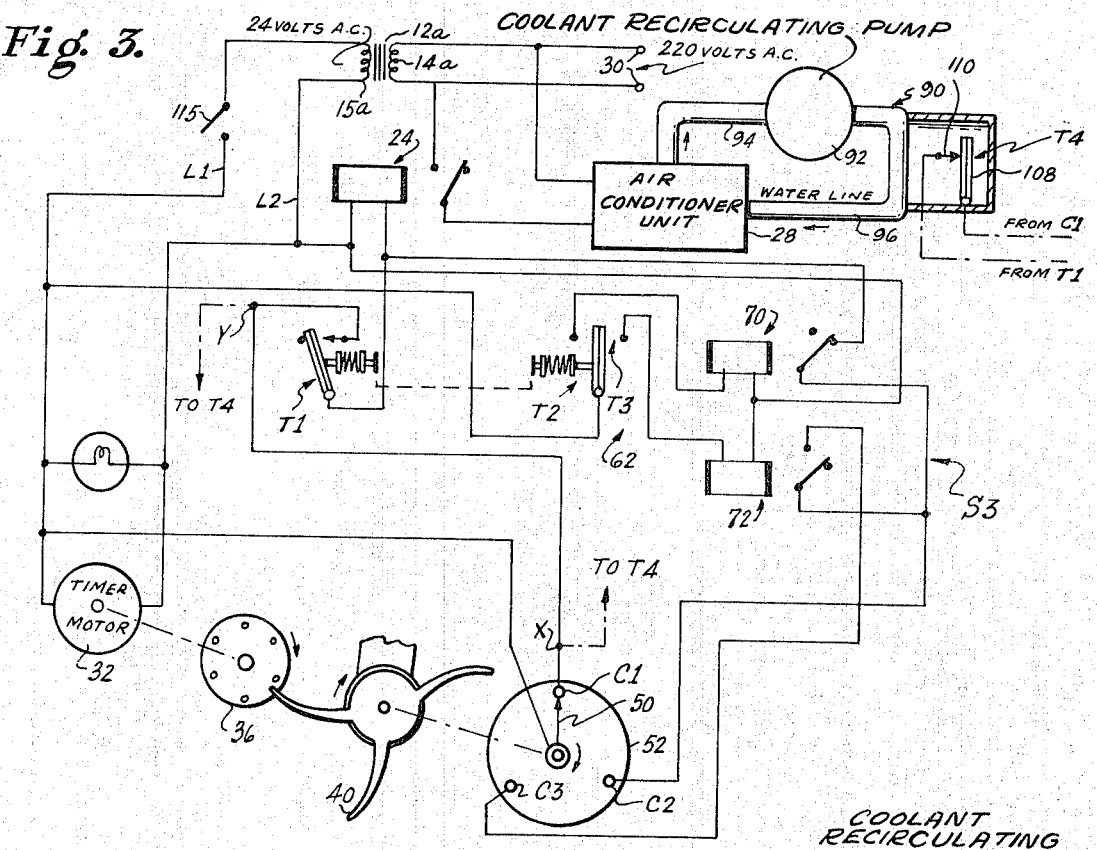
FIG. 3 is a diagram of another thermostatic control device involving another modification of the invention.

Referring first to FIG. 1, there is shown a thermostatic control system S1 in which electric power at 120 volts A.C. is provided from an external source to input terminals 10, 11. A stepdown transformer 12 has its primary winding 14 connected across terminals 10, 11 in series with a switch 16. Switch 16 is one section of a double pole, single throw switch 18. Switch 18 has another switch section 20 connected in series with coil 22 of compressor actuating relay 24. The relay has open contact terminals 25, 26 connected to a combined air conditioner refrigerant and compressor condensing unit 28 and power supply input terminals 30 of a 220 volt A.C. source. The combined compressor and condensing unit includes a refrigerant compressor and a refrigerant condenser.

Secondary winding 15 of transformer 12 develops 24 volts A.C. which is applied via lines L1, L2 to terminals of a continuously operated timer motor 32. A pilot lamp 34 can be connected across the motor terminals to indicate that power is being applied to the motor. Motor 32 has a shaft 35 which drives a timer disk 36 having six pins 38 spaced circumferentially apart. The pins engage curved arms 40 extending radially from disk 42 which is carried by shaft 45 of a three position switch 46 mounted on a support 48. Shaft 45 rotates contact arm 50 around stationary disk 52 which has three contacts C1, C2 and C3 spaced apart for individual contact by the arm 50 in each of the three positions of switch disk 42. If disk 36 completes one revolution in six minutes, then once each minute switch disk 42 will be thrown 120° angularly. Since there are just three arms 40, a complete cycle of rotation of arm 50 will be completed in three minutes, and arm 50 will remain in contact with each of contacts C1, C2 and C3, for just one minute at a time. Arm 50 is connected to line L1 of the low voltage A.C. power supply taken off secondary winding 15.

Contact C1 is connected to stationary contact disk 52 of thermostat stage T1. This stage has a movable temperature bimetallic contact 53 provided with an adjustment knob 54 loaded by spring 55 so that the stage can be set to a desired temperature setting at which contact 53 will close with stationary contact 52'. This stage in effect includes a single pole, single throw switch. A dual thermostat assembly 60 includes two thermostat stages T2 and T3. Assembly 60 has movable bimetallic contact 62 which makes no contact with either stationary contact 64 or 66 when centered between them as indicated in the drawing. An adjustment knob 68 loaded by spring 70 is used to adjust the setting of the assembly to desired temperature settings at which contact 62 will close with contact 64 or with contact 66. Assembly 60 in effect includes a single pole, double throw switch. Knobs 54 and 68 can be ganged together as indicated by dotted line L so all thermostat stages can be adjusted and set simultaneously.

The system includes two relays 70 and 72. Relay 70 has normally closed contacts 73, 74 and relay 72 has normally open contacts 75, 76. Contact 53 of thermostat stage T1 is connected to terminal 77 or compressor relay coil 22. Contact 62 of thermostat assembly 60 is connected to low voltage line L1. Contact 64 is connected to one terminal 79 of relay coil 71. Terminal 80 of this relay coil and terminal 82 of relay coil 84 are connected to line L2 along with terminal 81 of relay coil 22. Contact 66 of thermostat T3 is connected to terminal 85 of relay coil 84. Contact 73 of relay 70 and contact 75 of relay 72 are connected together to contact C2 of on switch disk 52. Contact C3 on switch disk 52 is connected to relay contact 76. A recirculator 90 including pump 92 outlet line 94 and intake line 96 may be provided at compressor 28.

FIG. 4 shows the timing sequence of switch 46. Straight line A at zero voltage indicates no pulses passed to the compressor relay 24 when switches 16, 20 are open. When these switches are closed and the timer motor 32 is running, pulse diagram B indicates a pulse is applied at the low voltage V provided by the step down transformer 12, for one minute via contact C1 and contact arm 50. This occurs during the first minute of each three minute cycle. Pulse diagram C indicates that voltage V is applied via contact C2 during the second minute of each three minute cycle. Pulse diagram D indicates that voltage V is applied via contact C3 during the third minute of three minutes cycle. Pulse diagram E indicates that voltage V is applied during the first and second minute of each three minute cycle, via contacts C1, and C2 in turn. Pulse diagram F indicates that voltage V is applied during the entire three minutes cycle via contacts C1, C2 and C3 in turn. In FIG. 4, two complete three minute cycles are part of a third cycle are indicated, for about eight minutes of operation.

In the system shown in FIG. 1, thermostat stage T1 is set at the lowest temperature level, stage T2 is set at the next higher level and stage T3 is set at the next higher level. Thus, as illustrated in FIG. 5, the nominal setting of stage T1 is 69° F. and stages T2 and T3 are set at 70° F. and 71° F., repsectively. These are only nominal settings. Actually each stage has an operating range of three degrees of which the nominal temperature is at the center of the range. Thermostate stage T1 will open at 67.5° and close at 70° F. as indicated by dotted arrows in FIG. 5. Similarly, stage T2 will open at 68.5° F. and will close at 71.5° F. and stage T3 will open at 69.5° F. and will close at 72.5° F. It will be noted that there is an overlap of operating temperature ranges. The upper part of the range of stage T1 is overlapped by the range of stage T2 from 68.5° F. to 70.5° F. and is overlapped by the range of stage T3 from 69.5° F. to 70.5° F. This means that voltage V will be applied via switch contact C1 or C2 during the first two minutes of each cycle when the environmental temperature is between 68.5° F. and 70.5° F. Voltage V will be applied via switch, contact C1, C2 or C3 at all times during the entire three minutes cycle when the environmental temeprature ranges between 69.5° F. and 70.5° F.

In operation of system S1, when contact arm 50 reaches contact C1, low voltage supplied by transformer 15 is applied to compressor coil 22 to energize this relay and operate the compressor if the environmental temperature of thermostat stage T1 is above the closure level for this stage. Stages T2 and T3 are in effect deactivated because contacts C2, C3 are open. When contact arm 50 reaches contact C2, stage T1 is in effect deactivated because contact C1 is open. Since contacts 73, 74 are normally closed, the relay 24 will be actuated since voltage will be applied through contact arm 50 and switch contact C2. However, if relay 70 were energized at this time, no voltage would then be applied to the relay 24. This would occur if the environmental temperature was at or below the closing temperature of stage T2 when contacts 62, 64 would close. When contact arm 50 reaches a contact C3, thermostat stages T1 and T2 are in effect deactivated. Voltage will be applied via contact arm 50 and contact C3 to activate relay 24 via contacts 75, 76 only if relay 72 is then energized. Relay 72 will be energized at this time only if the temperature is at or above the temperature at which contacts 62, 66 of stage T3 close. It should be noted that stages T2 and T3 operate oppositely. Stage T2 closes when temperature falls below the bottom of the range of stage T2 as indicated in FIG. 5. Stage T3 closes only when temperature rises above the top of the range of stage T3 as indicated in FIG. 5. However, it should be understood that a stage will open or close only when environmental temperature falls below or exceeds its set range; otherwise if it is open it will stay open and it is closed it will stay closed when the environmental temperature is in the operating range of the stage. The effectiveness of system S1 to operate compressor 28 and bring down the environmental temperature will now be explained in connection with a preferred program cycle. Assume the initial environmental temperature is over 72.5° F., and further assume that 70° F. is the desired nominal temperature. This selection is arbitrary. It could be 75° F., 78° F. or some other temperature. The following cyclic conditions would occur:

PREFERRED PROGRAM CYCLE

| Operating state | Environmental temp., ° F. | Temperature change | Duration |
|---|---|---|---|
| T1, T2, T3 | > 72.5 | Falling | Full on (3 minutes cycle). |
| T1, T2 | 69.5 | do | On 2 minutes, off 1 minute. |
| T1 | 68.5 | Rising | On 1 minute, off 2 minutes. |
| T1, T2 | 71.5 | Falling | On 2 minutes, off 1 minute. |
| T1 | 68.5 | Rising | On 1 minute, off 2 minutes. |

The last three conditions ranging between 68.5° and 71.5° F. when the temperature starts rising if it falls to 68.5° F. and starts falling if it rises to 71.5° F., constitute a preferred tight or narrow temperature control. The range is just three degrees. During this time the temperature is rising only during a one minute period and is falling only during a two minute period. By the above operating program a great economy is effected in operating costs due to partial operating times during each cycle. Also, optimum comfort is imparted to occupants of the temperature controlled environment since the temperature is rising or falling for only a minute or two at a time. The basic reasons why these results are obtained are as follows:

As indicated previously, people are more comfort sensitive than temperature sensitive. For example, if at a time when the outside temperature is 90° F., a person enters an air conditioned area, he is not able to sense at first whether the temperature is 75° F. or 72° F. He will be immediately aware that it feels much cooler inside than outside and he will experience less temperature shock at a higher inside temperature. After he is inside long enough to become acclimated to the environmental temperature he will begin to make comfort judgments. The comfort provided by the air conditioning system is due only in small part to the static temperature. The comfort is mainly dependent on the relationship between the film of moisture on the person's skin and the velocity, humidity and relative temperature of the air which "scrubs it." In a typical conventional air conditioning system, the fan is operated full time for air conditioning circulation and the thermostat cycles the compressor on and off as the static temperature rises or drops. The result is that the compressor may be on for twenty minutes and then off for fifteen minutes, etc.

When the compressor is on, the air distribution is relatively great because the increased density of cold air causes it to maintain its velocity and direction as it travels from the register. This cold dry air scrubs the moisture film on the skin, lowering the skin temperature and signaling the body to reduce the rate of perspiration. The first several minutes of this phase are very pleasant, and then the body begins to feel a chill.

When the compressor cuts off, the air distribution soon becomes relatively poor, as the warm moist air leaving the register diffuses too rapidly to reach many parts of the air conditioned space. The skin temperature rises rapidly, signaling the body to perspire and this moisture is added to by the moisture now in the air as it leaves the register. In addition, the poor air distribution produces a feeling of oxygen starvation and this further increases the tendency of the body to perspire. After only a few minutes, this effect becomes acutely uncomfortable.

In order to counteract the undesirable effects of the condition when the compressor is off for an extended period of time, the thermostat is conventionally set at a much lower temperature then would otherwise be chosen, as a lower temperature disguises these effects and also reduces the interval of compressor off time.

From the foregoing it will be apparent that the periods of greatest air conditioning comfort are after the compressor is on for several minutes and when it is off for one or two minutes. The present invention is directly aimed at programming the compressor to provide this optimum comfort cycle; and as the above examples of a preferred cycle indicates, this the present invention accomplishes. Not only does the present invention control the compressor to increase comfort, it makes it possible to operate the system at a higher temperature than is otherwise considered proper and satisfactory so that material savings are effected in operating costs, fuel, charges, etc. It is even possible to operate a system with a lower capacity refrigeration installation than is conventionally supplied.

It will be understood that the present invention operates to average out the demand based on the heat load. Because of the averaging, the compressor is on for relatively short periods, and the recirculator of the air conditioner has to be only large enough to handle this average load. In conventional installations controlled by the usual thermostat, the extended periods of compressor operation are so great that the recirculator has to have enough heat dissipation capacity to handle the full time operating heat load from the compressor. Little or no benefit is derived from averaging very long cycles of operation.

By employing the present invention in an air conditioning system, a smaller capacity refrigeration unit can be selected than would otherwise be specified. This results because the comfort level provided by a smaller unit is as great or greater than is provided by a conventional unit without the benefit of the present invention. More comfortable cooling is effected at a higher temperature setting. As an example, if the outside temperature is 90° F., air conditioning equipment controlled by the present invention provides more comfort at a 75° F. setting than the equipment would provide when controlled by a conventional thermostat at a setting of 72° F. This difference means that less capacity is required from the air conditioner to provide adequate cooling and a saving of as much as 25% in power to drive the refrigeration unit can be realized or a refrigerative unit 25% smaller could be originally used.

Figure 2:
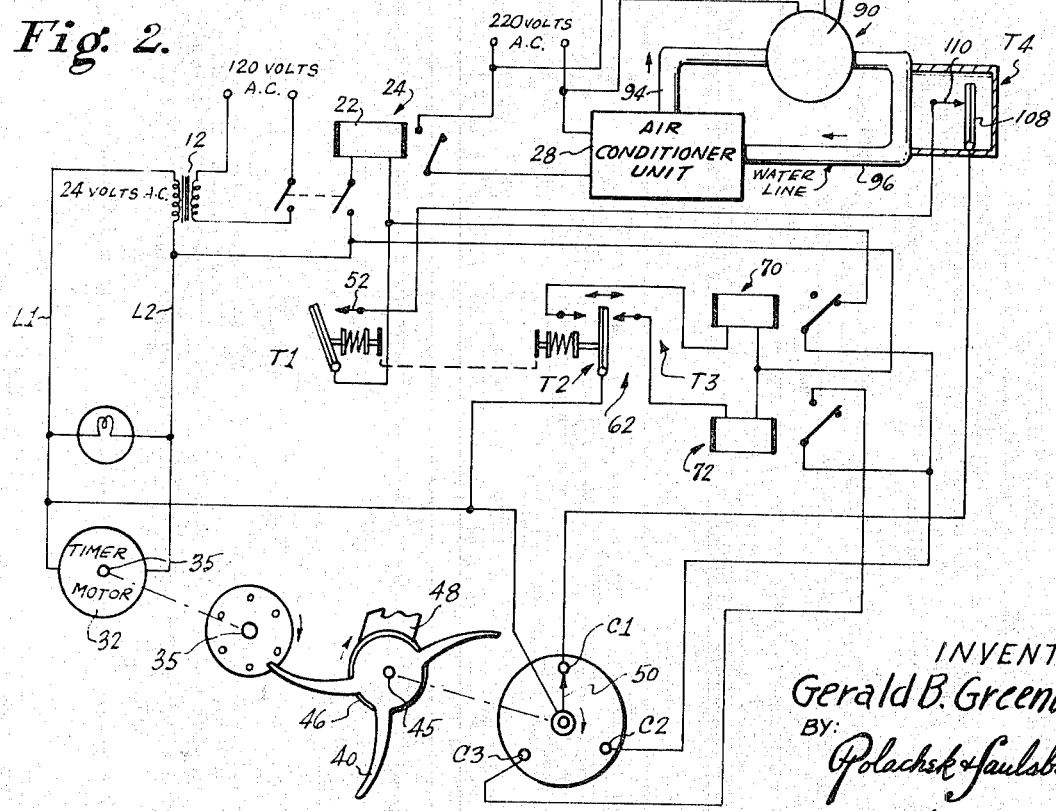
FIG. 2 is a diagram of a thermostatic control device similar to FIG. 1, illustrating a modification of the invention.

FIG. 2 is a diagram of a system S2 which is basically similar to system S1 and corresponding parts are identically numbered. In system S2 a low capacity coolant recirculator 90 is used with air conditioner refrigerant compressor and condensing unit 28. The recirculator has a coolant recirculating pump 92 to return water to the compressor and condensing unit via outlet line 94 from the compressor and condensing unit and intake line 96 to the compressor and condensing unit. A further thermostat T4 is installed at the intake line 96. Contact 108 of the thermostat is normally closed with contact 110 and the contacts open when the tempertaure in water line 96 rises above a predetermined level. Contacts 108, 110 are connected between contact C1 and contact 52 of the lowest temeprature thermostat stage T1. By this arrangement the thermostat T4 will open when the recirculator tends to permit the coolant water to overheat. Opening of thermostat T4 will prevent closure of thermostat stage T1 and this will prevent overloading the recirculator cooling system by reducing the heat load.

FIG. 3 is a diagram of another system which is basically similar to system S1 and corresponding parts are identically numbered. System S3 employs a power supply of 220 volts A.C. at input terminals 30 as in system S1 but the 110 volts A.C. power supply for energizing thermostat control system is omitted. Instead, a stepdown transformer 12a has primary winding 14a connected to terminals 30 and a secondary winding 15a which provides 24 volts to operate the thermostat control system. A switch 115 is provided in line L1 to the timer motor 32, compressor relay line L1 connected to the timer motor and contact 62 of dual thermostat assembly 60. If coolant recirculator 90 is of low capacity, then thermostat T4 can be provided as in system S2. Contact 108 will be connected directly to contact C1 at point X and contact 110 will be connected to contact 52 at point Y, as indicated by dot and dash lines. The wire 120 between points X and Y will be removed when the thermostat T4 is connected into the system. The thermostat will operate as described in connection with system S2 to deactivate the lowest temperature thermostat stage T1 when the coolant water returning to the compressor is overheated.

It should be understood that the several voltages referred to in describing operation of systems S1, S2 and S3 are only exemplary and other voltages can be used. Also, other time intervals than one minute each as referred to in connection with FIG. 4, can be used for the timing cycles of the sequence timer. The timer intervals can all be the same or they can be of different length in each timed cycle. Other temperature setting and operating temperatures of the several thermostat stages can be used than those referred to in connection with FIG. 5 and the preferred program cycle. For example, if narrower control of the temperature range is desired, the setting of FIG. 6 can be used. As indicated in FIG. 6, the nominal setting of stage T2 is 70° F., and stages T2 and T3 are set to 69° F. and 72° F., respectively. Thermostat stage T1 will open at 68.25° F. and will close at 69.75° F. Thermostat stage T2 will open at 69.25° F. and will close at 70.75° F. Thermostat stage T3 will open at 71.25° F., and will close at 72.75° F. It will be noted that there is an overlap of the two lower operating temperature ranges. The upper part of the range of stage 71 is overlapped by the lower part of the range of stage T2 from 69.25° F. to 69.75° F. The temperature range of thermostat stage T3 ranges from 71.25° F. to 72.75° F. This range is not overlapped by the two lower ranges as is the case illustrated by FIG. 5.

To summarize the benefits provided by the present invention, it will:

(1) Maximize comfort afforded occupants of an air conditioned environment.

(2) Provide more satisfactory temperature control in a narrower range.

(3) Reduce the capital investment required for installation of air conditioning equipment since smaller capacity units can be installed to provide the better results.

(4) Reduce operating expense due to use of smaller capacity units and due to more efficient use of units.

While the invention has been explained in connection with electromechanical units, electronic solid state components could be substituted. For example, a regulated power supply with a thermistor and voltage sensitive relays could be used to replace the thermomechanical thermostats. Also, a solid state sequence cycle timer could be used to replace the motor, electromechanical timer. Such modifications would permit remote setting of temperature points and might even lower power supply requirements.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. A programmed thermostatic control device for an air conditioning unit having an electrical control means, comprising a thermostat assembly having a plurality of thermostate stages each set to close at different predetermined nominal temperatures; a multiple position switch assembly; timer motor means operatively arranged to turn said multiple position switch assembly to each position in turn at predetermined times in a repetitive timed cycle; first circuit means respectively connecting the switch positions with different switch contacts of the respective thermostat stages; power supply means connected to said circuit means; and second circuit means arranged to apply power from said power supply means to said control means via each of said switch positions only when the contacts of the interconnected thermostat stage are closed.

2. A programmed thermostatic control device as defined by claim 1, wherein each of the thermostat stages is responsive over a predetermined narrow temperature range, the temperature range of response of a first one of said stages being overlapped by the temperature range of response of a second one of the thermostat stages so that power is applied to said control means during two successive time intervals of a timed cycle.

3. A programmed thermostatic control device as defined by claim 2, wherein the temperature range of response of a third one of the thermostat stages partially overlaps the temperature range of response of the first and second thermostate stages so the power is applied to said control means during three successive time intervals of himed cycle.

4. A programmed thermostatic control device as defined by claim 1, further comprising a high voltage power supply, the first named power supply being a step-down transformer arranged to supply power at lower voltage than said high voltage to said control means via said switch.

5. A programmed thermostatic control device as defined by claim 4, wherein the air conditioning unit includes refrigerant compressor and a refrigerating condenser, a coolant recirculating intake line to feed back coolant to the air conditioning unit; and further comprising a thermostat which is used for sensing temperature of coolant in said line; and further circuit means connecting said thermostat switch in series with one position of the multiple position switch and with one of the contacts of one of the thermostat stages, so that application of power to said control means is dependent on the temperature of coolant in said coolant recirculating line.

6. A programmed thermostatis control device as defined by claim 1, wherein said plurality of thermostat stages are three in number, and wherein said multiple position switch has three switch positions, the switch contacts at one of the stages constituting a single pole, single throw switch, connected in series with a first one of the three switch positions; the switch contacts at the second and third of the three stages constituting two sections of a single pole double throw switch, said first circuit means comprising a first relay with normally closed contacts connected in series with a second one of the three switch positons, and said circuit means further comprising a second relay with normally open contacts connected in series with a third one of the three switch positions.

7. A programmed thermostatic control device as defined by claim 6, wherein the first relay has a coil connected in series with the contacts of the second thermostat stage, and wherein the second relay has a coil connected in series with the contacts of the third thermostat stage.

8. A programmed thermostatic control device as defined by claim 6, wherein the air conditioning unit includes a refrigerant compressor and a refrigerant condenser, a cooling recirculating intake line to feed back coolant to the air conditioning unit; and further comprising a thermostat switch for sensing temperature of coolant in said line; and further circuit means connecting said thermostat switch in series with said first switch position and said switch contacts of the first thermostat stage, so that application of power to said control means is dependent on the temperature of coolant in said coolant recirculating line.

9. A programmed thermostatic control device as defined by claim 1, wherein the air conditioning unit includes a refrigerant compressor and a refrigerant condenser, a coolant recirculating intake line to feed back coolant to the air conditioning unit; and further comprising a thermostat switch which is used for sensing temperature of coolant in said line; and further circuit means connecting said thermostat switch in series with one position of the multiple position switch and with one of the contacts of one of the thermostat stages so that application of power to said control means is dependent on the temperature of coolant in said coolant recirculating line.

References Cited
UNITED STATES PATENTS

| | | | |
|---|---|---|---|
| 2,713,250 | 7/1955 | Blatchford | 62—157X |
| 2,720,084 | 10/1955 | Hailey | 62—158 |
| 3,122,003 | 2/1964 | Sullivan | 62—157 |
| 3,227,662 | 10/1966 | Winters | 62—157X |

MEYER PERLIN, Primary Examiner

U.S. Cl. X.R.

62—203, 209, 227